Nov. 4, 1958     D. E. TRUMBULL ET AL     2,859,017
APPARATUS FOR AIR-FREE MIXING OF FLUID MATERIALS
Filed Oct. 18, 1956     3 Sheets—Sheet 1
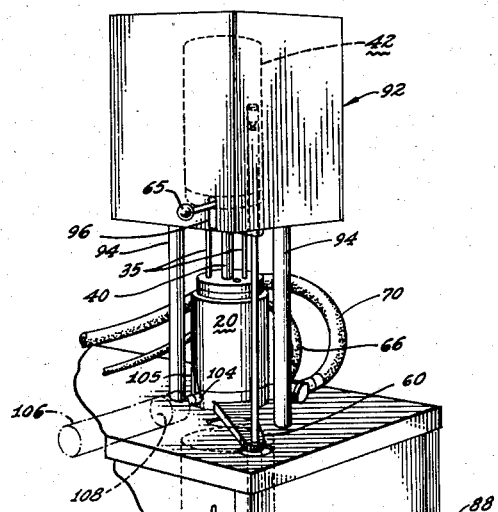
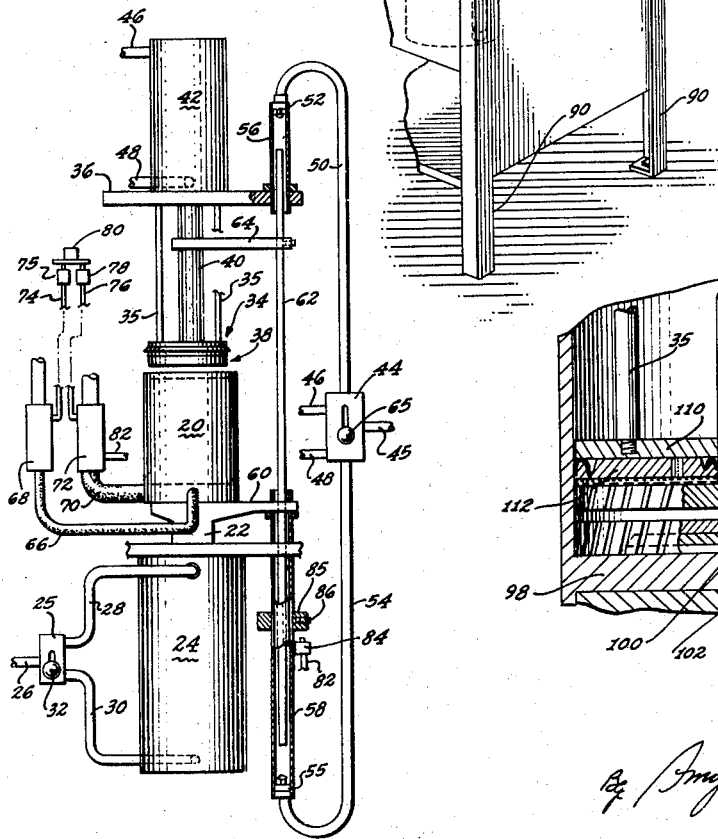
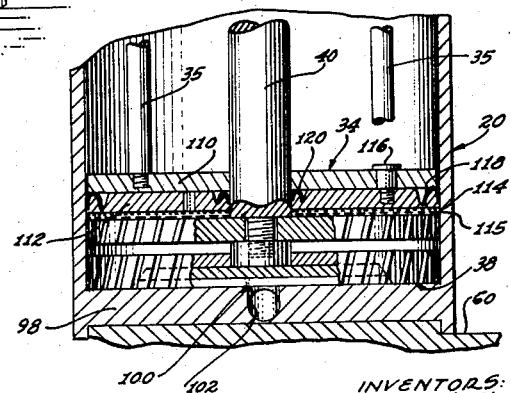
INVENTORS:
Donald E. Trumbull
George G. Stevenson
Herbert L. Trautmann
Attorneys Nov. 4, 1958 D. E. TRUMBULL ET AL 2,859,017
APPARATUS FOR AIR-FREE MIXING OF FLUID MATERIALS
Filed Oct. 18, 1956 3 Sheets-Sheet 2

INVENTORS:
Donald E. Trumbull
George G. Stevenson
Herbert L. Trautmann

Attorneys

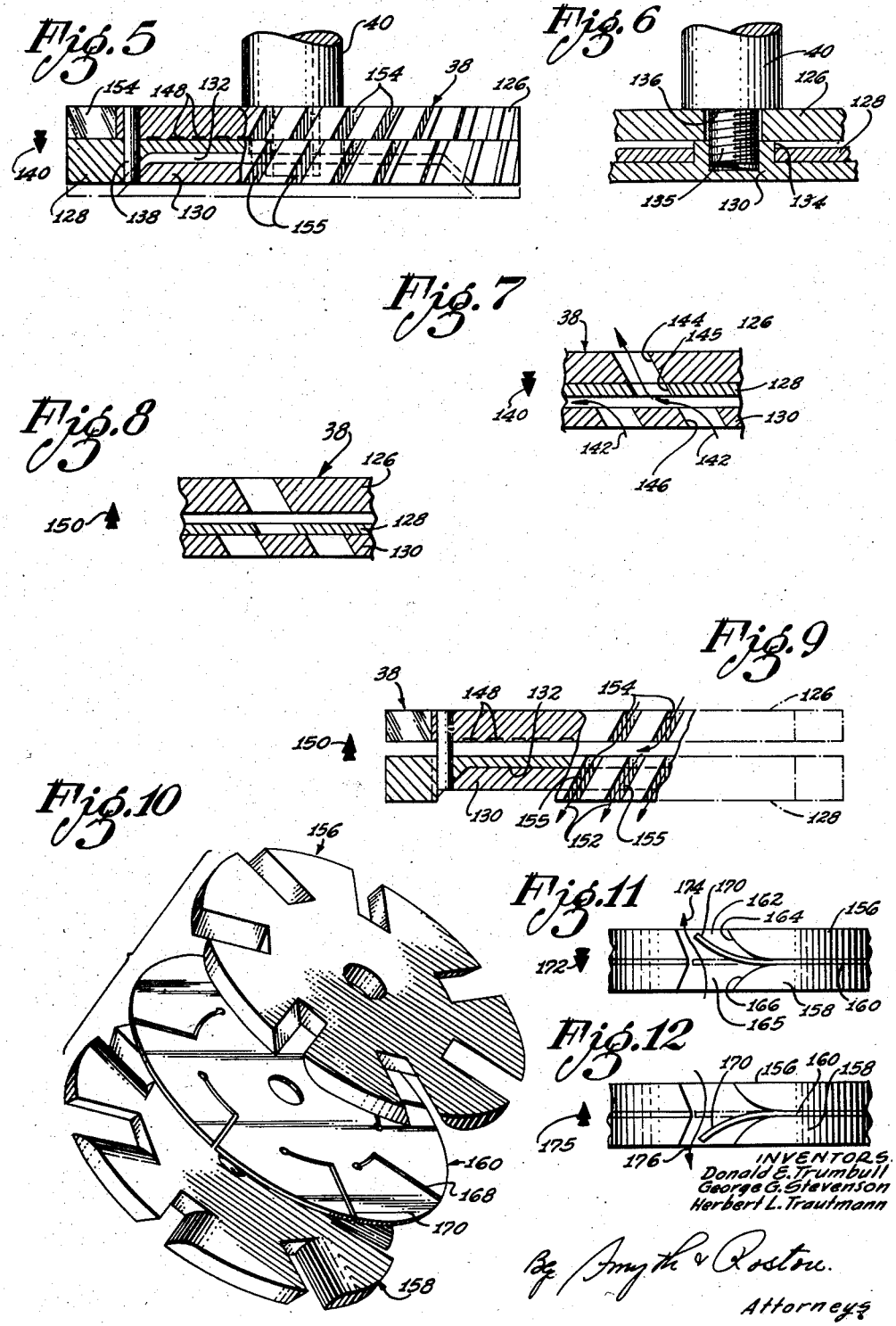

United States Patent Office 2,859,017
Patented Nov. 4, 1958

2,859,017

APPARATUS FOR AIR-FREE MIXING OF FLUID MATERIALS

Donald E. Trumbull, Inglewood, George G. Stevenson, Venice, and Herbert L. Trautmann, San Marino, Calif., assignors to Semco Research, Inc., Inglewood, Calif., a corporation of California Application October 18, 1956, Serial No. 616,773

20 Claims. (Cl. 259—2)

This invention relates to an apparatus for mixing fluid materials and has special utility in those instances where the fluid materials are highly viscous and/or exclusion of air from the mixture is essential.

The invention has been initially embodied in an apparatus for the specific purpose of mixing ingredients including an accelerator to provide a highly viscous sealant composition of the general character of a synthetic rubber-like sealant known to the trade as Thiokol. This particular practice of the invention is described herein by way of example and will provide adequate guidance for those skilled in the art who may have occasion to apply the same principles to the solution of other mixing problems.

The specific purpose of the sealant mixture in this initial practice of the invention is to serve as a cement or sealing means in various ways in the fabrication of aircraft. One of the important uses of the composition is to seal the structure of a hollow aircraft wing so that the whole wing may serve as a fuel tank.

In a typical procedure, the sealant mixture is placed in dispensing tubes having suitable dispensing nozzles by means of which the sealant is applied to the aircraft structure. Once such a mixture is compounded with the included accelerator, it must be used within a few hours. For this reason, the sealant is mixed in small batches as required to meet the daily demand.

It is desirable to keep such a sealant free of bubbles or air pockets even for ordinary applications since such bubbles or air pockets weaken the applied sealant body. Substantially complete exclusion of air is mandatory in aircraft use because, at high altitudes the difference between atmospheric pressure and the pressure of the entrapped air may be sufficient to cause the entrapped air to rupture the sealant structure. The problem, then, is to achieve a bubble-free sealant mixture in which the components are finely and thoroughly intermixed to facilitate chemical reactions among the ingredients and to transfer the mixture to the dispensing tubes without the introduction of air into the sealant.

The present apparatus includes a mixing container that is open at one end, a closure that slidingly fits into the container for contact with the contents, and a dasher that reciprocates between the container bottom and the closure for thorough intermixture of the contents. The closure is of a vented construction that releases air from the interior of the container to the atmosphere without permitting escape of the viscous content, and means is provided for the application of yielding pressure of substantial magnitude to urge the closure and the container bottom towards each other to cause the desired discharge of air from the container interior.

With the closure held under yielding pressure at its inner limit position at which it presses the dasher against the container bottom, the ingredients to be mixed are introduced under higher pressure into the bottom of the container to force the closure and the container bottom apart. The pressure of the closure against the inflowing ingredients effectively removes any air that may be in the container at the start of this filling operation, the air escaping through the vented closure. The dasher is then reciprocated for thorough intermixture of the ingredients.

The completely processed mixture is dispensed from a bottom port into the dispensing tubes, the sealant being extruded into the tubes by the pressure that urges the closure and the container bottom towards each other. Preferably, plastic tubes are used in which the end walls of the tubes are in the form of slidable pistons that are initially positioned adjacent the tube nozzles. Such a dispensing tube contains only an exceedingly small quantity of air prior to the introduction of the sealant and the flow of the sealant into the tube displaces the piston towards the opposite end of the tube. It is apparent that the described procedure avoids any opportunity for the introduction of air during the feeding of the ingredients into the mixing container as well as during the mixing operation, and finally, during the transfer of the completed mixture of the dispensing tubes.

One feature of the invention is the construction of the closure that permits air to be released from the pressurized content of the container without permitting release of the viscous content. For this purpose, at least one pair of apertured plates or disks is provided with the apertures in one plate out of register with the apertures in the other plate, the two plates being contiguous for intimate face-to-face mutual contact in response to the pressure of the closure against the ingredients. For complete expulsion of air, this arrangement provides vent paths of such tortuous configuration and of such small cross-sectional dimension as to prevent the escape of the viscous material even under relatively high pressure.

Another feature of the invention is the construction of the dasher. The dasher has numerous passages through which the material is forced for efficient intermixture of the ingredients. In the preferred practices of the invention, the apertures in the dasher are so constructed and arranged as to cause circumferential displacement of the material passing through the dasher, with consequent rotation of the body of material. It is further preferred that the rotation of the material be in the same circumferential direction in response to the opposite directions of reciprocation of the dasher.

Other features relate to the control of the initial filling operation and the control of the subsequent dasher operation for mixing the materials. With reference to the filling operation, the apparatus is adjustable for the introduction of selected volumes of material into the mixing container, the filling operation being terminated automatically in response to a selected spacing between the closure and the container bottom. With reference to the mixing operation, means is provided to vary the length of the path of reciprocation of the dasher automatically in accord with the variable distance of separation between the closure and the bottom of the container.

The features and advantages of the invention may be understood from the following detailed description, considered with the accompanying drawings.

In the drawings, which are to be regarded as merely illustrative:

Figure 1 is a fragmentary, perspective view of a selected embodiment of the invention for mixing a sealant of the character described;

Figure 2 is a diagrammatic representation of the principal working parts of the apparatus together with the controls therefor;

Figure 3 is a fragmentary sectional view, on an enlarged scale, showing the construction of the container bottom, the dasher and the closure;

Figure 5 shows the dasher, partly in section and partly in side elevation;

Figure 6 is a fragmentary sectional view of the central portion of the dasher, showing how an intermediate dasher plate is mounted for relative axial movement for automatic valve action in response to reciprocation of the dasher through the material in the container;

Figure 7 is a fragmentary sectional view, showing how the intermediate dasher plate takes an upper position during the downward movement of the dasher, to open one set of apertures for imparting rotary motion to the ingredients;

Figure 8 is a similar view showing how the intermediate dasher plate takes a lower position during upward movement of the dasher to cut off the passages shown in Figure 7;

Figure 9 is a view of the dasher, partly in section and partly in side elevation, showing how the dasher provides passages during the upward movement of the dasher to impart rotary motion to the ingredients in the same rotary direction;

Figure 10 is an exploded view of an alternate form of dasher;

Figure 11 is a fragmentary side elevation of the second form of dasher, showing how material passes therethrough with rotational displacement on the downward movement of the dasher; and Figure 12 is a view similar to Figure 11, showing how the material passes through the dasher with rotational displacement during the upward movement of the dasher.

GENERAL ARRANGEMENT

Figures 4, 4A:
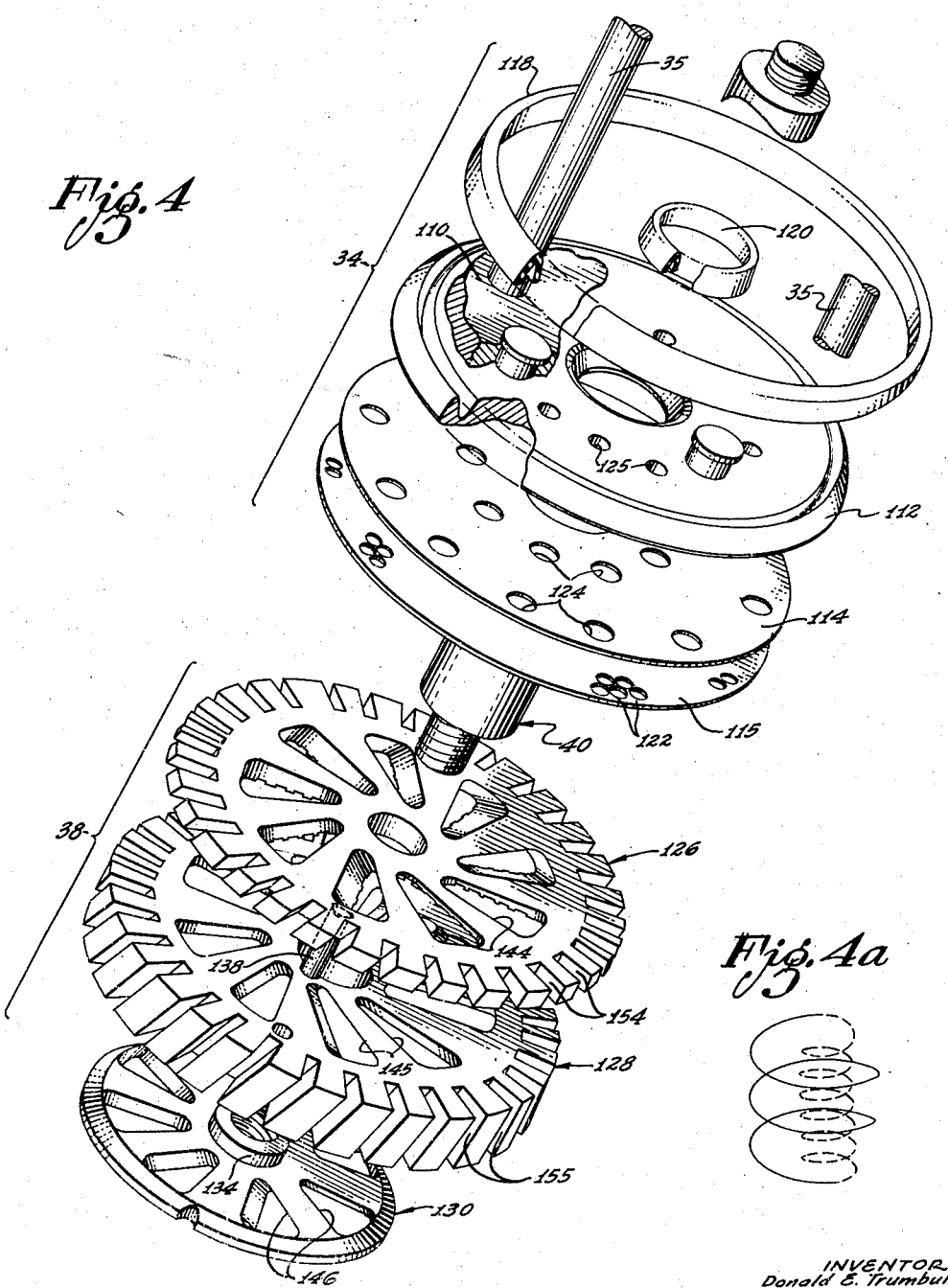
Figure 4 is an exploded perspective view of the closure assembly and the dasher assembly.
Figure 4a is a diagram of the flow pattern produced by the dasher.

Figure 2 shows diagrammatically and by way of example the principal working parts of a selected embodiment of the invention. An open-top mixing container 20 is mounted on the end of a piston rod 22 that extends upward from a lower pneumatic pressure cylinder 24. A suitable four way control valve 25 is connected to a compressed air source by a supply pipe 26 and is connected to the opposite ends of the pressure cylinder 24 by pipes 28 and 30. The control valve 25 has an operating handle or lever 32 that is movable selectively to three positions, namely: an intermediate "off" position; an upper position to lift the mixing container; and a lower position to lower the mixing container.

A closure, generally designated by numeral 34, comprises a plurality of disks assembled together in a manner to release air from the interior of the container without releasing the viscous material, this closure assembly being adapted to telescope into the container in a sliding manner. The closure 34 is fixedly mounted on the lower ends of a pair of fixed rods 35 that extend downward from a fixed overhead support 36. Thus, the effective volume of the mixing container 20 depends upon the extent to which the container is moved upward relative to the fixed closure 34 by the lower power cylinder 24.

A dasher, generally designated by numeral 38, is mounted on the lower end of a piston rod 40 that extends downward through the closure 34 from an overhead pneumatic power cylinder 42. A suitable control valve 44 for the overhead power cylinder 42 is connected by a pipe 45 to a compressed air source and is connected to opposite ends of the power cylinder by pipes 46 and 48.

The control valve 44 is also connected by a hose 50 to an upper normally closed poppet-type pilot valve 52 and is connected by a hose 54 to a lower normally closed poppet-type pilot valve 55. The upper pilot valve 52 is mounted in the upper end of a tube 56 that is fixedly mounted on the overhead support 36, and, therefore, is fixedly related to the closure 34. The lower pilot valve 55 is mounted in the lower end of a second tube 58 which is supported by an arm 60 that extends laterally from the lower piston rod 22. Thus, the lower pilot valve 55 is movable with the mixing container 20. What may be termed a reversing rod 62 is carried by an arm 64 that extends laterally from the upper piston rod 40, and is, therefore, movable with the dasher 38.

The control valve 44 has a lever-type handle 65 that is movable selectively to three positions, namely: an intermediate "off" position; an upper position for lifting the dasher 38; and a lower position for causing the dasher to reciprocate inside the container 20. The reciprocation of the dasher is controlled by the reversing rod 62 in cooperation with the two pilot valves 52 and 55, the movement of the dasher being reversed downwardly by contact of the upper end of the reversing rod with the upper pilot valve 52 and being reversed upwardly by contact of the lower end of the reversing rod with the lower pilot valve 55. Thus, the upper end of the reversing rod and the upper pilot valve may be considered as one pair of cooperating controls and the lower end of the reversing rod together with the lower pilot valve may be considered as a second pair of cooperating controls. In this manner, the range of vertical reciprocation of the dasher 38 is varied automatically in accord with variations in the spacing of the bottom of the container relative to the closure 34.

A supply hose 66 controlled by a valve means 68 is connected to the bottom of the container 20 for the introduction of a viscous accelerator into the container in opposition to the pressure created by the lower power cylinder 24. A second hose 70 controlled by a valve means 72 is also connected to the bottom of the container for introduction of the viscous sealant also in opposition to the pressure created by the lower power cylinder 24. The valve means 68 is an adjustable metering device that in the initial stage of the filling operation causes a predetermined quantity of the accelerator to be introduced into the container 20. The valve 72 is subsequently cut off when sufficient sealant is introduced into the container to make up the desired total quantity.

Both of the valve means 68 and 72 may be suitably adapted to open simultaneously. For this purpose, the valve means 68 may be connected by a small hose 74 to a poppet-type pilot valve 75, and the valve means 72 may be connected by a small hose 76 to a second poppet-type pilot valve 78. The two pilot valves 75 and 78 are normally closed and are positioned close together for opening operation by a single push button 80. The valve means 72 is connected by a small hose 82 with a normally closed poppet-type pilot valve 84 that is operated by a stop member 85 carried by the previously mentioned tube 58. When a predetermined total quantity of the two ingredients is introduced into the mixing container 20, the stop member 85, moving downward with the container, impinges on the pilot valve 84 to cause the valve means 72 to cut off the introduction of the sealant.

Either the position of the pilot valve 84 or the position of the stop member 85 may be adjustable to vary the point in the downward progress of the mixing container at which the pilot valve 84 is actuated. In this instance, the stop member 85 is adjustably secured on the tube 58 by a set screw 86.

THE DETAILS OF CONSTRUCTION

As shown in Figure 1, the present embodiment of the invention includes a low cabinet 88 mounted on four legs 90 and an upper housing 92 that is supported by a pair of columns 94 extending upward from the cabinet. The lower power cylinder 24 that controls the vertical movement of the mixing container 20 is mounted inside the cabinet 88 and the previously mentioned valve handle 32 for controlling the operation of this power cylinder extends through a slot 95 in the front wall of the cabinet. The upper power cylinder 42 that actuates the dasher 38 is in the upper housing 92 and the previously mentioned valve handle 65 for controlling the operation of the upper power cylinder extends through a slot 96 in the forward wall of the housing.

The hose 66 for supplying accelerator and the hose 70 for supplying sealant are both suitably connected to the bottom of the mixing container 20. For example, as shown in Figure 3, the mixing container 20 may have a relatively thick bottom wall 98 with a radial passage 102 therein connecting with a short passage 100 that opens into the interior of the container, and both of the hoses 66 and 70 may be connected in communication with these two passages.

The bottom of the container 20 is also provided with a dispensing port controlled by a dispensing valve 104 having a handle 105. The dispensing valve 104 is adapted to mate with the nozzle of a dispensing tube of the character heretofore mentioned. Figure 1 indicates in phantom how such a dispensing tube 106 having a retracted end wall or piston 108 may be positioned at the dispensing valve 104 to receive a quantity of the completed mixture.

As shown in Figures 3 and 4, the closure 34 may comprise an assembly of plates or disks including a pair of relatively thick upper disks 110 and 112 and a lower pair of relatively thin disks 114 and 115. The two upper disks 110 and 112 are secured together in face-to-face relationship by suitable screws 116 to confine an outer sealing ring 118 in contact with the circumferential wall of the mixing container 20 and an inner sealing ring 120 that embraces the piston rod 40. These two sealing rings are V-shaped in cross-sectional configuration and the disk 112 is formed with annular recesses that retain the rings in a manner to permit the rings to perform their sealing functions.

The two lower thin disks 114 and 115 are slidingly mounted on the piston rod 40 and tend to drop away from the upper disk. The lowermost disk 115 has numerous closely spaced perforations 122. The next thin disk 114 has two circular rows of larger apertures 124. The next adjacent relatively thick disk 112 has a single circular row of apertures 125 which are on a different radius than the apertures 124, and, therefore, are out of register with the apertures 124.

When the viscous ingredients are introduced into the bottom of the mixing container 20, in opposition to the pressure created by the lower power cylinder 24, the viscous material moves upward through the passages of the dasher 38 into contact with the lowermost perforated disk 115. Since the lowermost disk 115 has so many closely spaced perforations, and therefore is of the general character of a screen, it is incapable of trapping air and the inflowing viscous material readily displaces all air through the perforated disk to make intimate uniform contact with the disk. Since the inflowing material is highly viscous, it lifts the lowermost perforated disk 115 into contact with the apertured disk 114 and the two thin disks then cooperate to offer increased resistance to flow of the viscous material through the closure assembly. Finally, two thin disks 114 and 115 are pressed into intimate contact with the relatively heavy disk 112.

At this final point, the only possible paths of upward escape for the sealant are tortuous paths of relatively small cross section. Thus, the escape paths, which may be called vent paths, would involve lateral flow between the contiguous disks 114 and 112 from the apertures 124 of disk 114 to the apertures 125 of disk 112, and lateral flow between the upper thick disks 110 and 112 from the apertures 125 of disk 112 to the outer circumferential clearance space at the container wall and the inner clearance space adjacent the piston rod 40. The ingredients of the mixture are too viscous for escape through these tortuous avenues even when under high pressure, but any air or vapor inside the mixing container 20 readily escapes along these paths and does so under the pressure to which the viscous material is subjected by the lower power cylinder 24.

As best shown in Figures 4, 5 and 9, the dasher 38 in the selected embodiment of the invention comprises an upper plate 126, an intermediate plate 128 and a lower plate 130. As shown in Figures 5 and 9, the underside of the intermediate plate 128 is formed with a large central circular recess 132 and the lower plate 130 is of relatively small diameter to fit into this recess.

As shown in Figure 6, the lower plate 130 is formed with a concentric sleeve 134 that is threaded onto a reduced end portion 135 of the piston rod 40 to clamp the upper plate 126 fixedly against a radial shoulder 136 of the piston rod. The intermediate plate 128 is slidingly mounted on the sleeve 134 with freedom for substantial axial movement between the upper plate and the lower plate. The three plates are keyed together at predetermined rotary positions relative to each other by means of a pin 138 that is mounted in the upper plate 126 and extends slidingly through the intermediate plate 128 to the lower plate 130.

When the dasher 38 is moved downward through the viscous material, as indicated by the arrows 140 in Figures 5 and 7, the viscous material passes upward through inclined passages in the dasher, the paths of flow being indicated by the arrows 142. It will be noted that the pressure of the viscous material during this downward movement of the dasher forces the intermediate plate 128 against the upper plate 126.

The inclined dasher passages shown in Figure 7 are formed by an inner circle of apertures in the three members comprising inclined apertures 144 in the upper plate 126, inclined apertures 145 in the intermediate plate 128, and inclined apertures 146 in the lower plate 130. It is to be noted that the apertures 145 of the intermediate plate 128 are in register with the apertures 144 of the upper plate 126, but are out of register with the apertures 146 of the lower plate 130.

When the dasher reverses from its downward movement to its upward movement through the viscous material, the intermediate plate 128 drops away from the upper plate 126 in response to the frictional force of the viscous material. To minimize the tendency of the intermediate plate to adhere to the upper plate, the upper plate may be formed on its underside with a plurality of shallow, annular grooves 148, as indicated in Figures 5 and 9. When the intermediate plate 128 drops against the lower plate 130, it functions in the manner of a valve member to cut off the apertures 146 in the lower plate 130, and thus prevents downward flow through the described inner circle of passages.

When the dasher moves upward through the viscous material, as indicated by the arrows 150 in Figures 8 and 9, with the previously mentioned inclined passages closed as shown in Figure 8, the viscous material flows downwad through a second set of inclined passages in the dasher, as indicated by the arrows 152 in Figure 9. These passages of the second set are outside the circumference of the small diameter lower plate 130 and are formed by inclined peripheral slots 154 in the upper plate 126 together with similar inclined peripheral slots 145 in the intermediate plate 128. It is to be noted that the inclined slots 144 and 145 are out of register with each other so that the second set of passages is open only during the upward movement of the dasher, these passages being closed during the downward movement of the dasher, as may be seen in Figure 5.

The inclination of the second set of passages formed by the slots 144 and 145 is in the opposite circumferential direction from the inclination of the inner set of passages formed by the apertures 144, 145 and 146. It will be apparent that, since the two sets of oppositely inclined passages are effective during opposite directions of movement of the dasher, both sets of passages impart rotary motion to the viscous material in the same rotary direction. Thus, as the dasher assembly is viewed in Figure 4, downward movement of the assembly causes clockwise rotary displacement of the viscous material by virtue of the inclined deflecting surfaces of the apertures 144, 145 and 146, and upward movement of the dasher causes similar clockwise rotary displacement of the material by virtue of the inclined deflecting surfaces of the slots 154 and 155.

The actual flow pattern involved in this mixing action is a combination of a helical pattern and a toroidal pattern as shown in Figure 4a. On the up stroke of the dasher the fluid flows helically downward through the dasher on an outer diameter as shown by the solid line. On the down stroke of the dasher the fluid flows helically upward through the dasher on an inner diameter as shown by the dotted line.

The manner in which the described embodiment of the invention operates to serve its purpose may be readily understood. Starting with the mixing container 20 empty and with the dispensing valve 104 of the container closed, the handle 32 of the valve 25 is lifted to its upper position to cause the lower power cylinder 24 to exert upward pressure on the container to position the bottom of the container against the dasher 38 with the dasher 38 pressed, in turn, against the closure 34, as shown in Figure 3.

The push button 80 is then depressed to open the two valves 68 and 72 by means of the corresponding pilot valves 75 and 78 to cause the accelerator to be introduced into the bottom of the container by the supply hose 66 and to cause the sealant to be introduced in the same manner through the supply hose 70. As heretofore stated, the valve 68 passes a measured quantity of the accelerator before the mixing container 20 is filled with the desired total volume of ingredients. After the total charge of accelerator has been introduced into the mixing container 20, the introduction of the sealant by the supply hose 70 continues until the stop 85 on the downwardly moving tube 58 makes contact with the pilot valve 84 to cause the sealant supply valve 72 to be cut off. During this downward movement of the container 20 by the introduction of the pressurized ingredients in opposition to the pressure exerted by the power cylinder 24, air and vapors are completely expelled from the interior of the container through the vented closure 34, as heretofore explained.

When the mixing container 20 is filled in the described manner, the handle 65 of the control valve 44 is moved to its lowermost position to cause the upper power cylinder 42 to reciprocate the dasher 38. When the dasher approaches contact with the bottom wall 98 of the container, the reversing rod 62 depresses and opens the lower pilot valve 55 to operate the control valve 44 for reversal of the direction of movement of the dasher. When the dasher approaches contact with the closure 34, the reversing rod 62 operates the upper pilot valve 52 in the same manner to actuate the control valve 44 for downward reversal in the direction of movement of the dasher. Thus, the dasher traverses fully the space between the closure 34 and the bottom wall 98 of the mixing container 20, the length of the path of reciprocation being automatically adjusted to the spacing of the bottom container wall from the closure. The repeated division of the confined material into numerous small streams through the dasher, with repeated rotary displacement of the material in the same rotary direction, results in complete homogenous intermixture of the ingredients in a relatively small time.

At the completion of the brief mixing period, the handle 65 of the control valve 44 is moved to its uppermost position to cause the upper power cylinder 42 to lift the dasher 38 against the closure 34. With the confined material still under the pressure of the lower power cylinder 24, the tubes 106 are positioned successively with the nozzles of the tubes mating with the dispensing valve 104. The valve handle 105 is manipulated to permit extrusion of the desired quantity of the sealant from the container 20 into each tube, the extrusion pressure being provided by the lower power cylinder 24. When the mixing container 20 is emptied in this manner, it is again at its upper starting position, shown in Figure 3, ready for a new operation cycle, with the container bottom against the dasher and with the dasher against the closure.

It is apparent from an inspection of Figures 5, 7, 8 and 9 that the dasher causes the viscous material to be forced past relatively sharp edges and there is reason to believe that the sharp edges play an important part in the effectiveness of the dasher in the intermixing of the ingredients. Figures 9 to 12 indicate the construction of an alternate form of dasher that is relatively simple in construction and operates in the same general manner with special effectiveness with respect to the action of relatively sharp edges.

This second form of dasher comprises a relatively thick, rigid upper circular plate 156, a similar relatively thick lower ridge plate 158, and an intermediate thin plate 160 of highly resilient material. The thin plate 160 may be made of spring steel or spring bronze. These three plates are clamped tightly together in fixed position on the lower end of the previously described piston rod 40.

The upper circular plate 156 is provided with a series of radial slots 162 which incline in one axial direction and which have rounded surfaces 164. The lower plates 158 have radial slots 165 that are inclined in the opposite radial direction and are formed with similar rounded surfaces 166. The peripheral slots 162 and 165 are registered with each other to form passages through the dasher, as may be seen in Figures 11 and 12.

The intermediate, thin, resilient plate 160 has angular cuts 168 therein which form a resilient tongue 170 at each pair of registered slots 162 and 165, the tongue extending from the region of the curved surfaces 164 and 166 towards the opposite wall of the passage.

At its unrestrained configuration, each resilient tongue 170 extends straight across the dasher passage, as indicated in broken lines in Figures 11 and 12. During the downward movement of the dasher, indicated by the downward arrow 172 in Figure 11, the viscous material is forced upward through the dasher, as indicated by the upward arrow 174, and the pressure of the material causes the corresponding resilient tongue 170 to flex slightly upward, as shown in solid lines in Figure 11. The inclination of the upper aperture 162 causes circumferential displacement of the material in one rotary direction and the forcing of the material at the outer edge of the resilient tongue 170 is conducive to thorough intermixture of the ingredients. On the return upward movement of the dasher indicated by the upward arrow 175 in Figure 12, the viscous material is forced downward through each dasher passage, as indicated by the downward arrow 176, for circumferential displacement of the material in the same rotary direction.

Our description in specific detail of the selected embodiment of the invention, together with the alternate form of dasher, will suggest various changes, substitutions and other departures from our disclosure within the spirit and scope of the appended claims. Thus, the container 20 may be of simplified construction with no inlet connections, it being contemplated that the container will be filled manually.

We claim:

1. In an apparatus for mixing ingredients, the combination of: a container for the ingredients, at least one end of the container being open; a closure for said one end slidingly positioned inside the container; means to cause said closure to press against the ingredients in the container whereby the distance between the closure and the other end of the container varies with the volume of the ingredients; a dasher mounted in said container; means to cause relative reciprocation between said dasher and the container; a first pair of controls for mutual contact to reverse the relative movement of the dasher towards said other end of the container, one member of said pair being fixed relative to the dasher and the other member being fixed relative to said closure; and a second pair of controls for mutual contact to reverse the relative movement of the dasher towards said closure, one member of said second pair being fixed relative to the dasher, the other member of the second pair being fixed relative to the container.

2. A combination as set forth in claim 1, in which said actuating means is a fluid-pressure-actuated means and each of said pairs of controls comprises a pressure-responsive pilot valve and means for actuating contact therewith.

3. A combination as set forth in claim 1, in which said closure is vented for displacement of air from the interior of the container to the atmosphere without release of the ingredients.

4. A combination as set forth in claim 1, in which said container has a normally closed dispensing outlet to be opened after a mixing operation for extrusion of the mixture from the container by the pressure against the mixture exerted by the container and the closure.

5. A combination as set forth in claim 1, in which said closure is fixed in position, said container is movable, and which includes means exerting pressure on said container to urge said other end of the container towards the closure thereby to cause the closure to exert pressure on the contents of the container.

6. A combination as set forth in claim 5, in which said means to exert pressure on the ingredients is a fluid-pressure-actuated means, and in which the means to actuate the dasher is also a fluid-pressure-actuated means.

7. Means to mix liquid ingredients with minimum inclusion of air, comprising: a container for the ingredients at least one end of the container being open; said container having at least one inlet port near its other end; a closure slidingly positioned inside the container at least one of said container and said closure being movable relative to the other; a dasher in the container; means to apply yielding pressure to urge relative movement between said container and closure in the direction to position the closure near said other end of the container with the dasher confined therebetween; vent means to release gaseous fluids from the container without releasing liquid fluids; pressurized supply means to force ingredients into said inlet port with consequent increase in the spacing between said closure and the closed end of the container; and means to reciprocate said dasher between said closure and the closed end of the container.

8. A combination as set forth in claim 7, in which said container has a normally closed dispensing outlet for opening after a mixing operation for extrusion of the mixture from the container by the pressure exerted against the contents of the container by the closure and the container.

9. A combination as set forth in claim 7, which includes means to cut off said supply means in response to a predetermined spacing between said closure and said other end of the container.

10. A combination as set forth in claim 7, in which said means to reciprocate the dasher includes: a first pair of controls for mutual contact to reverse the movement of the dasher towards said other end of the container, one member of said pair being fixed relative to the dasher and the other member being fixed relative to the closure; and a second pair of controls for mutual contact to reverse the movement of the dasher towards said closure, one member of said second pair being fixed relative to the dasher, the other member of the second pair being fixed relative to the container.

11. In an apparatus for mixing ingredients, the combination of: a container for the ingredients, at least one end of said container being open; a closure slidingly positioned inside the container; means to cause said closure to press against the ingredients in the container whereby the distance between the closure and the other end of the container varies with the volume of the ingredients, said closure including a pair of apertured plates with the apertures in one plate out of register with the apertures in the other plate, said plates being contiguous for intimate face-to-face contact in response to pressure of the closure against the ingredients to confine the ingredients while permitting air to escape from the container; a dasher mounted in said container for reciprocation between said closure and said other end of the container; and means to actuate said dasher.

12. A combination as set forth in claim 11, which includes means in sliding contact with the interior of the container to form a seal between the container and the outermost of said two apertured plates.

13. A combination as set forth in claim 11, which includes a third innermost perforate plate movable against said pair of apertured plates.

14. In an apparatus for mixing ingredients, the combination of: a container for the ingredients, at least one end of the container being open; a closure for said one end slidingly positioned inside the container; means to cause said closure to press against the ingredients in the container whereby the distance between the closure and the other end of the container varies with the volume of the ingredients; a dasher mounted in said container; means to cause relative reciprocation between said dasher and the container; and means responsive to changes in the distance between said closure and said other end of the container to vary the range of relative reciprocation between the dasher and the container.

15. In an apparatus for mixing ingredients, the combination of: a container to confine a quantity of said ingredients; and a dasher spanning the interior of the container for reciprocation longitudinally thereof, said dasher comprising a pair of plates and flexible sheet material positioned between said plates, said plates having openings therein forming passages through the dasher for passage therethrough of the material of the ingredients, said flexible sheet material forming blades extending across said passages, said blades being resiliently flexible to bend in response to the pressure of the material thereby to form inclined deflecting surfaces to cause lateral displacement of the material.

16. In an apparatus for mixing ingredients, the combination of: a container to confine a quantity of said ingredients; a dasher spanning the interior of the container for reciprocation longitudinally thereof, said dasher having passages for passage therethrough of the material of the ingredients; and blades extending across said passages, said blades being resiliently flexible to bend in response to the pressure of the material thereby to form inclined deflecting surfaces to cause lateral displacement of the material, the free ends of said blades all extending in the same circumferential direction whereby the blades deflect the material in the same circumferential direction on both movements of the dasher to cause unidirectional rotation of the contents of the container.

17. In apparatus for mixing ingredients, a combination of: a container to confine a quantity of the ingredients; a dasher spanning the interior of the container for reciprocation longitudinally thereof, said dasher having passages for passage therethrough of the ingredients; a first means incorporated in said dasher and responsive to fluid pressure against a first face thereof to open a first set of passages therethrough for flow of the ingredients through the dasher, said passages being inclined for displacement of the ingredients in one rotary direction; and a second means incorporated in said dasher and responsive to fluid pressure against the opposite face thereof to open a second set of passages therethrough for flow of the ingredients through the dasher, said second set of passages being inclined for displacement of the ingredients in said one rotary direction.

18. A combination as set forth in claim 17, in which one of said sets conforms to an inner circle and the other conforms to an outer circle to result in a flow pattern that is toroidal as well as helical.

19. A combination as set forth in claim 17, in which said passages through the dasher have offset portions for tortuous flow of the material therethrough.

20. A combination as set forth in claim 17, in which said dasher comprises three plates held against relative rotation and apertured to form said two sets of passages, one of said plates being axially movable relative to the other two by the pressure of the material to close said two sets of passages alternately.

References Cited in the file of this patent

UNITED STATES PATENTS

| | | |
|---|---|---|
| 2,435,527 | Arpin | Feb. 3, 1948 |
| 2,730,338 | Gregorius | Jan. 10, 1956 |

FOREIGN PATENTS

| | | |
|---|---|---|
| 584,166 | Germany | Sept. 15, 1933 |